A. O. TATE.
PRIMARY BATTERY PLATE.
APPLICATION FILED FEB. 25, 1908.
977,145.
Patented Nov. 29, 1910.
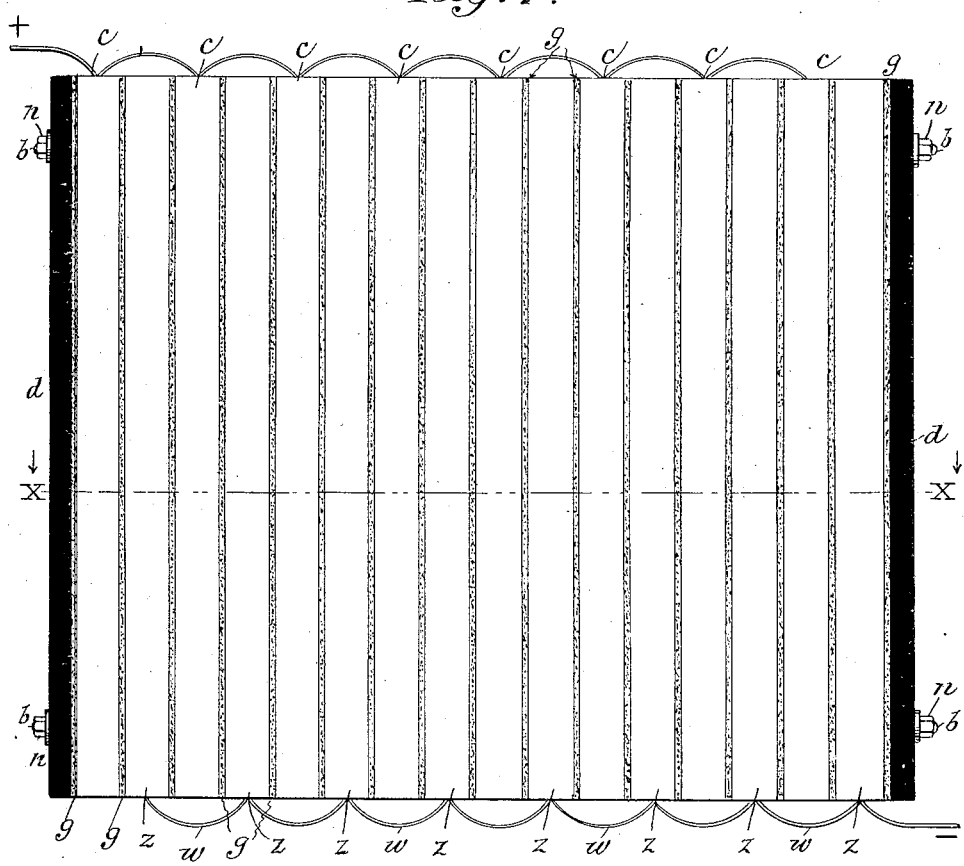
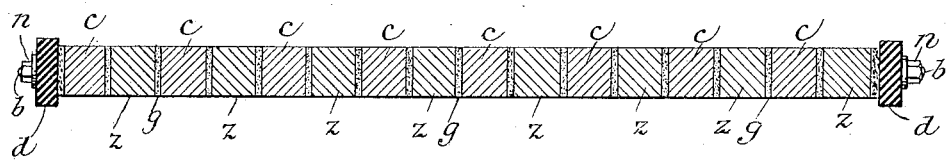
Witnesses:
Edward Rowland
M. F. Keating
Inventor
Alfred O. Tate
By his Attorney
Charles J. Kintner

UNITED STATES PATENT OFFICE.

ALFRED O. TATE, OF TORONTO, ONTARIO, CANADA.

PRIMARY-BATTERY PLATE.

977,145.

Specification of Letters Patent. Patented Nov. 29, 1910.

Application filed February 25, 1908. Serial No. 417,688.

*To all whom it may concern:*

Be it known that I, ALFRED O. TATE, a subject of the King of Great Britain, and resident of the city of Toronto, Province of Ontario, Dominion of Canada, have made a new and useful Invention in Primary-Battery Plates, of which the following is a specification.

My invention has for its object, to increase the efficiency of such batteries by materially decreasing the internal resistance thereof, and to this end I construct a battery plate in such manner as to be of a bifunctional nature, and I effect this result by combining the positive and negative elements of the battery in very close mechanical and electrical relation with each other, the parts when assembled being of the most compact form.

My invention will be fully understood by referring to the accompanying drawings, in which, Figure 1 is a side elevational view of my improved bifunctional primary battery plate, full size. Fig. 2 is a transverse sectional view thereof taken on the line X—X and as seen looking thereat from the top toward the bottom of the drawing.

As illustrative of the preferred form of my invention I assemble sectional positive and negative elements in such manner as to constitute a single plate or element of a bifunctional character and separate the positive and negative sections by relatively thin strips of insulating material $g$, $g$, preferably of a porous nature. These sections and strips are interleaved in the manner shown in the drawings and bound together between insulating side bars $d$, $d$, by insulating bolts $b$, $b$, $b$, $b$, and nuts $n$, $n$, $n$, $n$, after which the positive sections $c$, $c$, are all electrically connected together in multiple by a conductor $w$ and the negative sections $z$, $z$, similarly connected together by a conductor $w$.

I prefer to make the positive sections $c$, $c$, of compressed oxid of copper and the negative elements $z$, $z$, of metallic zinc, and I also prefer that the separating media, in the nature of insulating material $g$, $g$, shall be of thin strips of kaolin.

I do not limit my invention, however, to the use of such materials, as I contemplate generically the use of any of the well known materials in the art, whereby potential electrical energy is obtained in primary batteries, when such elements are combined in the manner described so as to constitute a bifunctional plate.

Having thus described my invention what I claim and desire to secure by Letters Patent of the United States is—

1. A bifunctional primary battery plate embracing interleaved positive and negative sections separated from each other by porous insulating material, the positive sections being all connected together at one end and the negative sections similarly connected together at the other end, and all of said parts held together by insulating bolts extending therethrough, substantially as described.

2. A bifunctional primary battery plate embracing interleaved positive and negative sections separated from each other by porous insulating material; in combination with insulating side bars and insulating bolts extending through the side bars and the sections, the positive sections of the plate being all connected together at one end and the negative sections similarly connected together at the other end, substantially as described.

In testimony whereof I have signed my name to this specification in the presence of two subscribing witnesses.

ALFRED O. TATE.

Witnesses:
C. J. KINTNER,
M. F. KEATING.